United States Patent [19]
Boehling et al.

[11] Patent Number: 5,761,518
[45] Date of Patent: Jun. 2, 1998

[54] SYSTEM FOR REPLACING CONTROL PROCESSOR BY OPERATING PROCESSOR IN PARTIALLY DISABLED MODE FOR TRACKING CONTROL OUTPUTS AND IN WRITE ENABLED MODE FOR TRANSFERRING CONTROL LOOPS

[75] Inventors: Warren A. Boehling, N. Attleboro; Stephen Albert Peck, III, Rehoboth; Alan Reid Wheeler, Raynham, all of Mass.

[73] Assignee: The Foxboro Company, Foxboro, Mass.

[21] Appl. No.: 609,063

[22] Filed: Feb. 29, 1996

[51] Int. Cl.$^6$ ........................................ G06F 11/22
[52] U.S. Cl. ............... 395/821; 395/182.11; 364/187
[58] Field of Search .................... 395/575, 182.05, 395/282, 821, 182.11, 182.1; 455/34.1; 348/8; 364/187

[56] References Cited

U.S. PATENT DOCUMENTS

| | | | |
|---|---|---|---|
| 3,864,670 | 2/1975 | Inoue et al. | 395/182.1 |
| 4,133,027 | 1/1979 | Hogan | 364/119 |
| 4,141,066 | 2/1979 | Keiles | 364/119 |
| 4,212,078 | 7/1980 | Games et al. | 364/900 |
| 4,303,973 | 12/1981 | Williamson, Jr. et al. | 364/103 |
| 4,468,738 | 8/1984 | Hansen et al. | 364/200 |
| 4,484,273 | 11/1984 | Stiffler et al. | 364/200 |
| 4,608,631 | 8/1986 | Stiffler et al. | 364/200 |
| 4,872,106 | 10/1989 | Slater | 364/200 |
| 4,958,270 | 9/1990 | McLaughlin et al. | 364/187 |
| 5,079,740 | 1/1992 | Patel et al. | 364/900 |
| 5,088,021 | 2/1992 | McLaughlin et al. | 364/187 |
| 5,142,470 | 8/1992 | Bristow et al. | 364/184 |
| 5,155,847 | 10/1992 | Kirouac et al. | 395/600 |
| 5,157,663 | 10/1992 | Major et al. | 371/9.1 |
| 5,274,808 | 12/1993 | Miyao et al. | 395/650 |
| 5,276,823 | 1/1994 | Cutts, Jr. et al. | 395/575 |
| 5,295,258 | 3/1994 | Jewett et al. | 395/575 |
| 5,297,272 | 3/1994 | Lu et al. | 395/500 |
| 5,307,481 | 4/1994 | Shimazaki et al. | 395/575 |
| 5,321,827 | 6/1994 | Lu et al. | 395/500 |
| 5,379,418 | 1/1995 | Shimazaki et al. | 395/575 |
| 5,481,670 | 1/1996 | Hatashita et al. | 395/182.05 |
| 5,515,514 | 5/1996 | Dhuey et al. | 395/282 |
| 5,535,426 | 7/1996 | Leigh et al. | 455/34.1 |

*Primary Examiner*—Thomas C. Lee
*Assistant Examiner*—David Ton
*Attorney, Agent, or Firm*—Leydig, Voit & Mayer

[57] ABSTRACT

A method and apparatus for performing an on-line replacement of an industrial process control processor module via loop-by-loop transfer of control blocks is described. After replacing a backup control processor module in a redundant processor configuration with a first upgrade control processor module, the first upgrade control processor module is placed in a partially operable mode enabling reading of control values from a control data storage. However, the partially operable upgrade control processor module cannot write values to the control data storage. Thereafter, control loops for an industrial control process are transferred, one loop at a time, from a primary control processor to the first upgrade control processor. After each loop is transferred, the capabilities of the first upgrade control processor are expanded to include write access to the control data storage associated with the transferred control loop. After all control loops have been transferred, the primary control processor is powered down and replaced by a second upgrade control processor module.

20 Claims, 3 Drawing Sheets

SYSTEM FOR REPLACING CONTROL PROCESSOR BY OPERATING PROCESSOR IN PARTIALLY DISABLED MODE FOR TRACKING CONTROL OUTPUTS AND IN WRITE ENABLED MODE FOR TRANSFERRING CONTROL LOOPS

AREA OF THE INVENTION

This invention relates generally to distributed computerized control of complex industrial processes, and more particularly to distributed process controller hardware and the replacement and upgrade thereof.

BACKGROUND OF THE INVENTION

There are a number of industries which have evolved to integrate complex industrial processes with distributed computerized control systems for those processes. Two such examples are the oil refining industry and the power generating industry. Both have plants which are in general distributed, but the separate elements of which, by necessity, require highly integrated control.

These industrial control systems have evolved to include distributed control processors at localized industrial equipment sites. The distributed control processors communicate with industrial process control hardware in the system and, to a lesser degree, with one or more control system operator consoles at a central operating station. The control processors also communicate directly with industrial process equipment such as pumps and furnaces.

A particularly successful distributed processor control system, the SPECTRUM (TM The Foxboro Company) system, has been developed and provided for a number of years by The Foxboro Company. The SPECTRUM system presently includes a number of distributed interface processor module types including a Unit Control Module (UCM), Field Input/Output System (FIO), Universal Input/Output System (UIO), and Universal Field Multiplexer (UFM).

The Unit Control Module (UCM) consists of a set; of up to thirty (30) separate analog and/or digital input and/or output cards arranged within three I/O nests having up to 10 cards each. The I/O cards are communicatively coupled to a pair of distributed control processors operating in a primary and backup (redundant) configuration. The distributed control processors, as will be known to those skilled in the art, execute control schemes and control communication with the I/O cards.

The Field Input/Output system (FIO) consists of a set of up to 128 separate analog and/or digital input and/or output cards arranged within eight I/O nests having up to 16 cards each. The I/O nests are communicatively coupled to a distributed control processor. The processor adjusts and linearizes signals received from and transmitted to the I/O nests to the extent needed in accordance with the FIO's primary task of providing an interface between the I/O nests and components of a SPECTRUM industrial process control system.

The Universal Input/Output system (UIO) consists of a set of up to thirty (30) separate analog and/or digital input and/or output cards arranged within three I/O nests having up to 10 cards each. The I/O cards are communicatively coupled to a distributed control processor which performs a primary task of providing an interface for communicating information between the I/O cards and components of a SPECTRUM industrial process control system.

The Universal Field Multiplexer (UFM) consists of a set of up to 96 separate analog and/or digital input cards arranged within eight I/O nests having up to 12 cards each. The I/O nests are communicatively coupled to a distributed control processor. The processor adjusts and linearizes signals received from the I/O nests to the extent needed in accordance with the UFM's primary task of providing a uni-directional interface for receiving signals from the I/O nests and forwarding in signals to components of a SPECTRUM industrial process control system.

In addition, the SPECTRUM system includes operator interface stations. Examples of such interface stations include the Videospec, SPECTRUM Multistation, and Fox 1A operator stations. These operator interface stations enable an operator to monitor the operation of the industrial process control system, and if necessary modify operating parameters of industrial process controllers.

The SPECTRUM system has been an extremely reliable system, indeed many of the systems have been in operation for nearly 15 years, and some new installations are being constructed. The network protocols provide reliable communication channels between the geographically distributed system components. However, the SPECTRUM network is proprietary and, as a result, is not compatible with open network architectures and equipment within such networks. Connecting non-SPECTRUM equipment to the SPECTRUM system requires a special purpose gateway device through which the proprietary network communicates to the non-SPECTRUM equipment.

As a result of tremendous improvements in the area of computer technology, new distributed control systems have been devised. Some distributed control systems now incorporate improved communication network architectures and their related network communication protocols. On such example is the well known Nodebus Local Area Network (LAN) architecture. The Foxboro Company has produced a more recent offering, known as the I/A SERIES (Registered Trademark of The Foxboro Company) industrial process control systems which incorporate the Nodebus LAN architecture. The distributed control processors of the I/A SERIES industrial control systems communicate at a local level to a set of special purpose nodes by field buses, and communicate with other control processors and central workstations over the Nodebus LAN. The open system architecture of the I/A SERIES system facilitates communication with non-proprietary equipment.

Like the SPECTRUM system, the I/A SERIES system is software driven and distributed. However, unlike the SPECTRUM system, software can be downloaded to the individual control processors at the distributed locations. As a result, modifications to the control algorithms driving special purpose control hardware, to which the distributed process controllers are attached, are relatively easy to accomplish.

Despite the high quality and proven reliability of the SPECTRUM system, there are a number of reasons for migrating from the SPECTRUM system to the I/A SERIES system for controlling industrial processes. The I/A SERIES industrial process control systems provide superior processing capabilities. More particularly, I/A SERIES systems include vastly superior computer processor and memory hardware which have been developed since the SPECTRUM system was initially designed and installed in various industrial plants. Newer processing units incorporated within I/A SERIES systems are capable of making computations at rates many times greater than the rate of the previously used SPECTRUM system processing units. Improvements to primary memory storage allow for more information to be directly addressed by the central processors. In addition, the I/A SERIES industrial process control systems employ the improved Nodebus LAN architecture. I/A SERIES systems also include state-of-the-art operator workstations having improved displays and graphical user interfaces. The new computer hardware is not only superior in certain respects to the old SPECTRUM system hardware, it is also relatively less expensive.

However, even in view of the above described advantages to the new industrial process control system, a strong sense of comfort by customers in a proven SPECTRUM system and a desire to have assurance that the new system will perform as well as the original SPECTRUM system weighs heavily against replacing the SPECTRUM system hardware by the improved current industrial process control hardware. A highly significant factor which frustrates attempts to replace a SPECTRUM system by an I/A SERIES system is that the industrial process subject to the SPECTRUM system control very often cannot be shut down without incurring a tremendous expense. It is reasonable to assume that in many instances it would be unacceptable to discontinue an industrial process for a day (or even an hour) in order to replace a SPECTRUM system. For example, if the control system were operating an oil refinery, one would anticipate a tremendous loss in raw materials and unacceptable production during the course of shutting the refinery down, then returning it to operation and stabilizing it after the upgrade. Therefore, absent a scheduled shutdown of the SPECTRUM system (an extremely rare occasion), it is not likely that a customer will seek to replace the present SPECTRUM system.

SUMMARY OF THE INVENTION

It is therefore a general object of the present invention to facilitate a transfer of responsibilities from an existing active processor module to an upgrade replacement processor module in a safe manner without disrupting the operation of the associated controlled industrial processes.

It is yet another object of the present invention to enable an operator to return control over transferred process control loops from the upgrade replacement processor module back to the existing active processor module in accordance with an aborted attempt to replace the existing processor module.

In accordance with the above and other objects, a method and apparatus are provided for replacing a processor module controlling industrial equipment in accordance with a set of control loops, by an upgrade processor module in a gradual manner, and without disrupting the operation of the controlled industrial equipment. The distributed industrial process control system embodying the present invention includes a processor module providing control signal data based upon executed industrial process control loops. The control signal data is received by industrial process equipment by means of a set of I/O devices communicatively coupled to an I/O bus. A bus arbitrator interposed between the I/O bus and the processor module governs write access by the processor module to the I/O bus.

Within the above described distributed industrial process control system the new method for replacing the processor module includes the initial step of installing an upgrade processor module within the distributed industrial process control system. Installing the upgrade processor module results in the establishment of a communicative link, not necessarily direct in view of the possible interposition of a bus arbitrator, between the upgrade processor module and the I/O bus.

After installation, the upgrade processor module is initially placed in a partially disabled mode. While operating in the partially disabled mode, the upgrade processor is capable of receiving signals transmitted on the I/O bus; however, the bus arbitrator prevents the upgrade processor from transmitting signals on the I/O bus. However, the output values calculated by the upgrade processor module while the upgrade processor module is operating in the partially disabled mode are tracked in order to verify proper operation of the upgrade processor module.

Next, operation of the upgrade processor module is transferred to a partial write enabled mode after the first operating step. During the partial write enabled mode, the bus arbitrator selectively allows write access by the upgrade processor module to the I/O bus, thus enabling the upgrade processor module to transmit control signals from the first upgrade processor module to the set of I/O devices. However, the upgrade processor module's write access is restricted by the bus arbitrator to designated ones of the multiple industrial process control loops.

While the upgrade processor module is in the partial write enabled mode, responsibility for control loops of the multiple industrial process control loops performed by the original processor module are transferred to the first upgrade processor controller on a loop-by-loop basis. Whenever responsibility for performing a control loop is transferred to the upgrade processor module, its partial write capabilities with respect to the I/O bus are expanded to include transmission of control signals associated with the transferred control loop.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which :

DETAILED DESCRIPTION OF A PREFERRED EMBODIMENT

Figure 1:
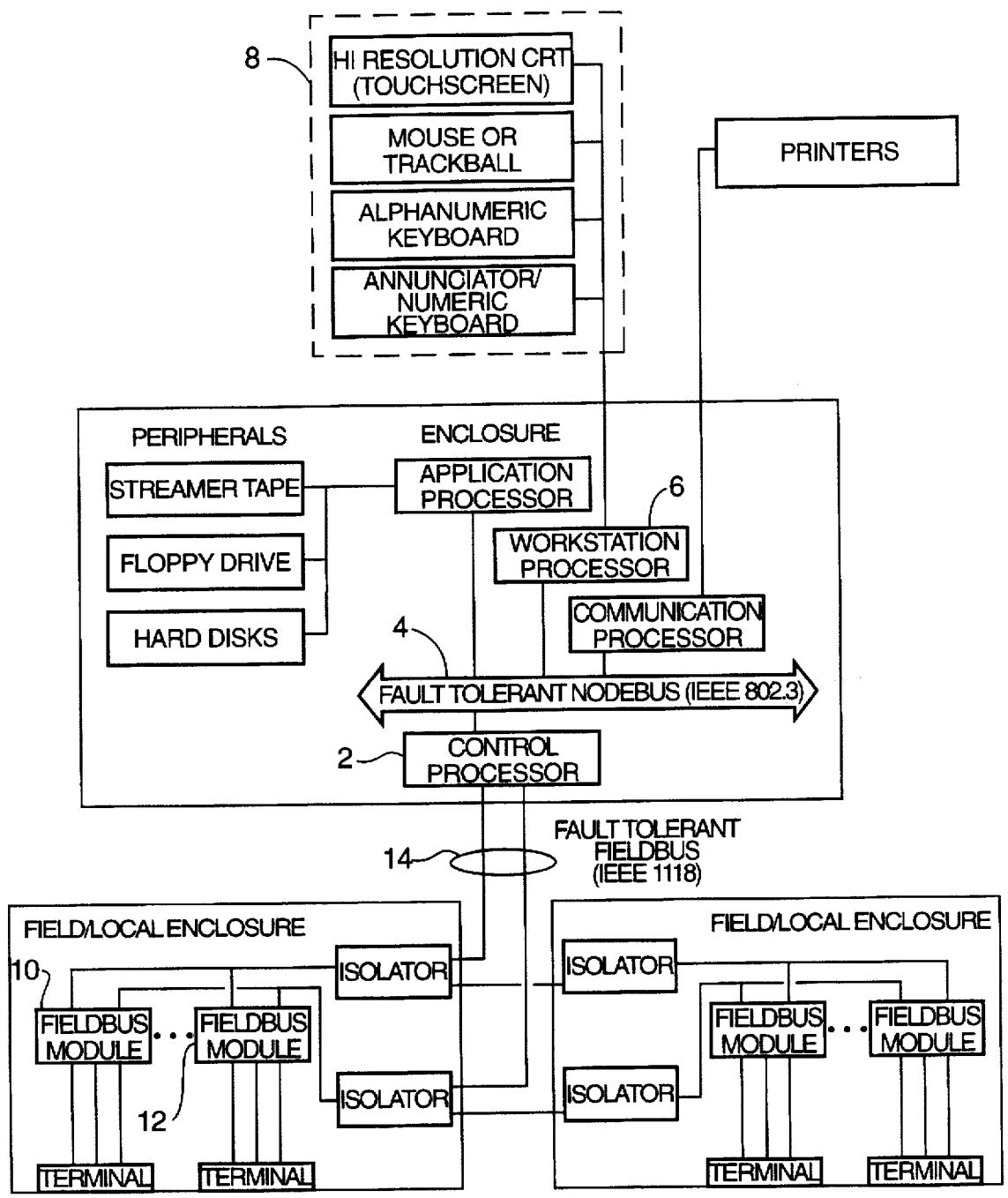
FIG. 1 is a high level schematic diagram of an exemplary process control environment wherein the method and apparatus for replacing a processor module card on-line in accordance with the present invention.

Turning to FIG. 1, a schematic block diagram is provided of an illustrative distributed industrial process control system. In particular, a control processor 2 communicates with various interface, I/O, and information storage devices as illustrated in FIG. 1 via a LAN Bus 4. Also connected to the LAN Bus 4 is a Workstation Processor 6 and associated user interface devices 8 facilitating monitoring operations of the control processor 2 and industrial processes operating under the control processor 2. It is noted that while only a single control processor (control processor 2) is included in the illustrative industrial process control system in FIG. 1, in alternative embodiments of the invention, a number of control processors may be provided.

The control processor 2 is connected via a new redundant bus 14 (comprising a Bus A and Bus B) to processor modules 10 and 12 which may be a standard I/A SERIES Fieldbus module 10 and SPECTRUM MIGRATION INTEGRATOR processor module 12 (described in greater detail below in conjunction with FIGS. 2 and 3). The processor modules 10 and 12 sense state information provided by sensors on terminal equipment associated with industrial processes. The processor modules 10 and 12 analyze the received state information and transmit appropriate control signals to the terminal equipment in order to maintain controlled operation of the industrial processes. While not shown in FIG. 1, the types of terminal equipment coupled to the distributed processor modules include industrial equipment such as that utilized in oil refining, chemical manufacturing, and electrical energy generation plants.

The known SPECTRUM system utilizes four distinct processor module types based upon a particular purpose for the module and the type of installation within which processor module is to be used. The above-mentioned UCM processor module is of particular relevance to the present invention. The UCM processor operates a series of control loops associated with a set of industrial processes monitored by remote sensors and communicatively coupled to the UCM via I/O cards in an I/O nest. It is essential to continuous proper operation of processes controlled by the UCM devices that control operations provided by the UCM responsible for controlling a given process are not disrupted for a significant period of time. In the case of the UCM configuration, the leads of a UCM processor module card are inserted into a connector communicatively coupling the UCM processor module to an I/A Series UCM processor bus of well known construction connecting the UCM processor module to a security card which, in turn, is connected to an I/O bus.

As explained above in the background, separate and distinct processor module cards have been used, in the well-known SPECTRUM control system, for each of four different processor module configurations. However, in an embodiment of the present invention, each of the four distinct processor module configurations are provided by a single SPECTRUM Migration Integrator (SMI) card. The SMI card is capable of replacing each of the four previous specific use processor cards having distinct signal interfaces. The design and advantages provided by the configurable card are described in Boehling et al. U.S. application SER. NO. 08/609,089, entitled "Automatically Configurable Multi-purpose Distributed Control Processsor Card For An Industrial Control System," filed on Feb. 29, 1996, now pending, the entire teachings of which are expressly incorporated herein by reference.

Figure 2:
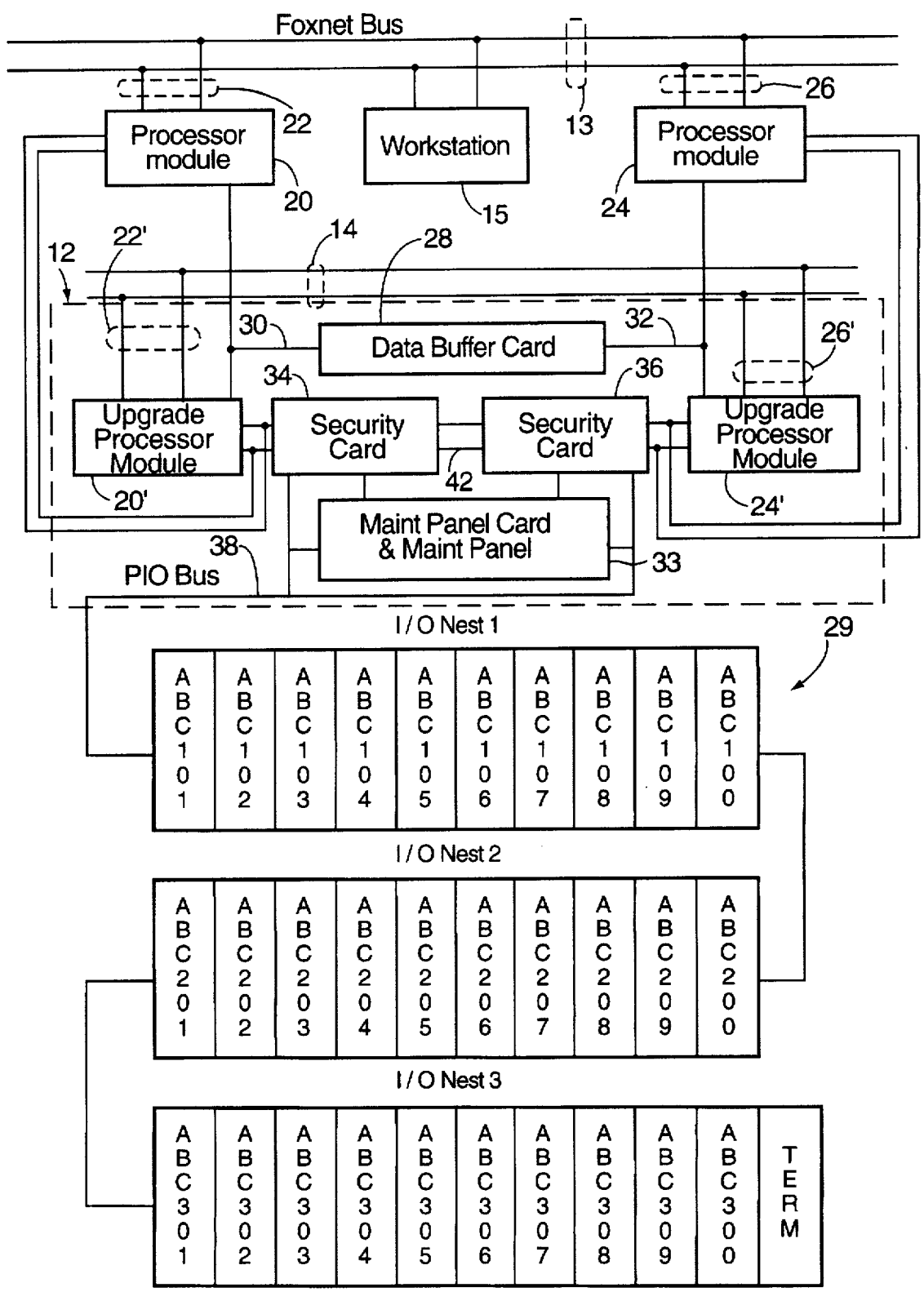
FIG. 2 is a schematic block diagram of a processor module system including primary and backup processor modules, and wherein the backup and then primary processor modules are replaced by means of an on-line replacement method in accordance with the present invention.

Turning now to FIG. 2, a schematic drawing is provided of an illustrative processor module system including a primary and backup processor module wherein an on-line replacement scheme embodying the present invention is employed. In a preferred embodiment of the present invention, the processor modules comprise UCM processor modules installed in a redundant (primary/backup) configuration. Before performing the on-line upgrade procedure (described below in conjunction with FIG. 3), a first processor module 20 (a UCM device) is communicatively coupled in a known manner via two sets of lines 22 to a preexisting redundant bus 13, a FOXNET (TM The Foxboro Company) communication bus. A second processor module 24 (another UCM device), structurally the same as the first processor module 20, is connected in like manner via lines 26 to the preexisting redundant bus 13. For purposes of describing an illustrative embodiment of the present invention, the first processor module 20 is designated as the primary processor module, and the second processor module 24 is designated as the backup processor module.

In accordance with a preferred embodiment of the present invention, the processor modules 20 and 24 are coupled in a known manner to a data buffer card 28. The data buffer card 28 facilitates sharing of status and control data between the first processor module 20 (the primary processor) and the second processor module 24 (the backup processor). The primary processor module updates the contents of the data buffer card 28 every 0.5 seconds. The backup processor module tracks I/O measurements by reading I/O signals from components within I/O nests 29. The backup processor module does not transmit control signals to the I/O components while the primary processor module is selected. However, as a result of the shared data and I/O measurement tracking, in the event the first processor module 20 fails or is taken off-line, the second processor module 24 can immediately take over control of I/O components in the attached I/O nests 29 and provide control information to the I/O components based upon the status and control data contained in the data buffer card 28 which is accessible to both the first processor module 20 and the second processor module 24 via address/data lines 30 and 32 respectively.

In addition to the processor modules 20 and 24, a maintenance panel and card 33 provides a third means for evaluating the status of I/O components within the I/O nests 29 and writing control values to the I/O components. The maintenance panel and card 33 allows I/O components' values to be manually examined and changed. Controlling the components in the I/O nests 29 through the maintenance panel and card 33 is typically used only when the processor modules, such as the first processor module 20 and the second processor module 24, are both non-functional. Security card 34, interposed between the first processor module 20 and the attached I/O nests 29; and security card 36, interposed between the second processor module 24 and the attached I/O nests 29 ensure that only a designated one of the processors 20 and 24 or maintenance panel and card 33 writes to the I/O nests 29 via a PIO Bus 38. Arbitration logic in the Security cards 34 and 36 ensures that only one of these potential sources has write access to the I/O components. The second processor module 24 monitors the operation status of the first processor module 20 via a communication channel link 42 between the security cards 34 and 36 in order to determine when to take over control of the I/O components. Activating the write capability of the maintenance panel and card 33 prevents both the processor modules 20 and 24 from writing to the I/O components via the PIO bus 38.

It is also noted that in a preferred embodiment of the present invention, the security cards 34 and 36 periodically switch control from a still functional primary processor module to the backup processor module. The purpose of switching control is to test the backup processor module for otherwise undetectable faults as well as to test the control transfer process. During the on-line processor card replacement procedure, this automatic periodic switching feature is temporarily blocked during portions of the card replacement procedure where the non-active processor module is not ready to control the I/O components of the I/O nests 29.

In the known SPECTRUM system primary/backup processor module configuration illustratively depicted in FIG. 2, only one of the processor modules 20 and 24 is permitted write access to the Data Buffer card 28 and the PIO Bus 38 at any given time. However, modifications are incorporated into the replacement upgrade processor modules and security cards in order to permit write access for both a primary processor module and a backup processor module during the on-line upgrade procedure. First, the security cards are modified to enable both of the processor modules in the primary/backup processor module system to write to the PIO bus 38 during the on-line upgrade procedure described below. However, only one processor module is granted write privileges at any given time to a specific control loop. Second, the upgrade processor module cards include a set of jumpers for designating a specified one of a set of operational modes utilized by the upgrade processor module cards during the on-line upgrade procedure. When the jumpers are set in an "upwrite" mode, the processor firmware enabling multiple write sources to the I/O components, and bus arbitration hardware on the upgrade security cards, which would otherwise cause the security cards 34 and 36 to allow only a single write source, is by-passed.

Figure 3:
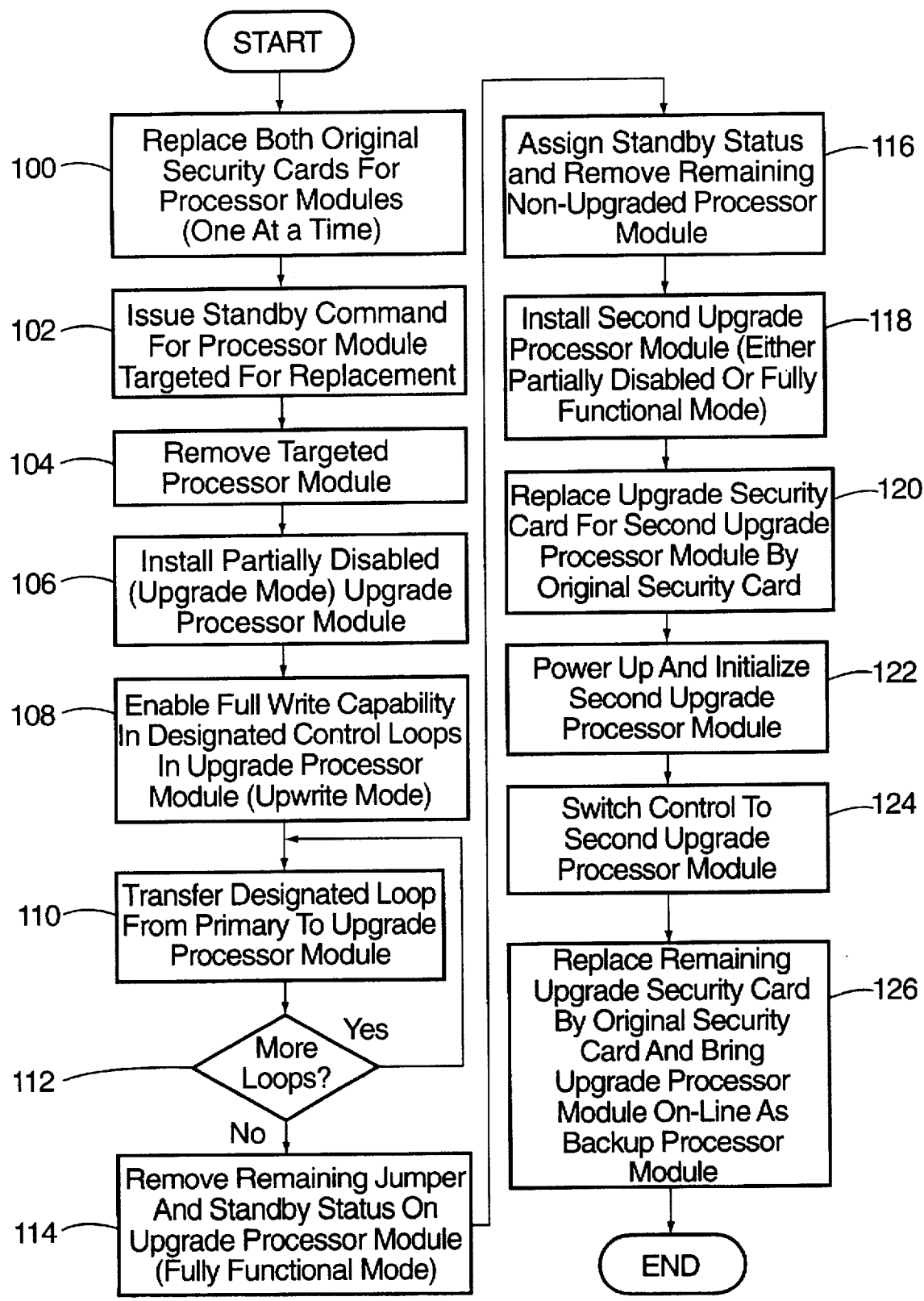
FIG. 3 is a detailed flowchart summarizing the steps for replacing the first and second modules in accordance with an illustrative embodiment of the present invention.

Turning now to FIG. 3, the steps are summarized for performing an on-line upgrade of an existing redundant processor module system (as illustratively depicted in FIG. 2) in accordance with a preferred embodiment of the present invention. Each I/O device in the attached I/O nests 29 is associated with a distinct process control loop operated under a processor module. In accordance with the present invention, control over a set of I/O devices is transferred from the first processor module 20 (the primary processor module) to the second processor module 24 in a gradual manner. The gradual transfer is accomplished without shutting down or disrupting industrial processes associated with the first processor module 20. Rather than transfer responsibility for all of the operating control loops from the first processor module 20 to the second processor module 24 at once, control loops are transferred a loop at a time. This capability to specify individual loops rather than having to transfer all of them at once is facilitated by special control features associated with improved security cards and the upgrade processor modules.

During step 100 of the replacement method embodying the present invention, both security cards 34 and 36 are replaced, one side at a time, by upgrade security cards 34' and 36' (not shown in FIG. 2). The upgrade security cards 34' and 36', inserted in place of the security cards 34 and 36, include modifications for enabling both a designated primary and a designated backup processor module to have write access to the I/O components of the attached I/O nests 29, thereby facilitating loop-by-loop transfer of I/O device control operations. In an illustrative embodiment of the invention, the upgrade security cards are publicly available Foxboro B0195KC security cards. The upgrade security cards 34' and 36' are installed in the same manner as the previously installed security cards 34 and 36.

A security card is interposed between each processor module and the PIO bus 38. Therefore, removing a security card severs the communication link between the PIO bus 38 and the associated processor module. As a consequence, even though both the security cards 34 and 36 are replaced during step 100, at least one security card is installed and properly connected to the PIO bus 38 and a processor module during step 100.

During step 100, the backup processor module 24 is shut down by first placing it in "standby" mode from the operator workstation 15 and then shutting the power off for the backup portion of the UCM module illustrated in FIG. 1 while the primary processor module 20 remains in control of the process. The backup security card 36 is then replaced by the upgrade security card 36'. Next, power is again provided to the backup processor module 24, and the backup processor module 24 resumes its tracking function in accordance with a control command from the operator workstation 15. A subsequent command from the operator workstation 15 causes the processor module 24 and the processor module 20 to switch primary/backup status so that the processor module 24 controls the process. Thereafter, the processor module 20 is placed in a "standby" state and powered down. Thereafter, the security card 34 is replaced by the upgrade security card 34'. Thereafter, the processor module 20 re-energized and a command from the operator workstation 15 causes the processor module 20 and the processor module 24 to resume their original roles.

Next, at step 102, a known "standby" command is issued via the operator workstation 15 to the second processor module 24 which is targeted for replacement. This status is forwarded to, and stored within, the upgrade security card 36' that was installed in place of the security card 36 during step 100. The issued standby command prevents the second processor module 24 from receiving control of any of the active process control loops until a command is issued by the operator workstation 15 to the processor module system, thereby releasing the standby status assigned to the backup controller. As a result, an operator is provided assurance that an upgrade processor module installed in place of the backup processor module 24 will not be selected to control the set of attached components within the I/O nests 29 until the processor module has been properly initialized and its functionality verified. The first processor module 20 operates without a backup processor module until the standby status is removed.

After issuing the standby command to the second processor module 24, at step 104 the second processor module 24 is disconnected from the processor module system and preexisting bus 13 illustrated in FIG. 2. When the removed processor module 24 is a SPECTRUM UCM, removal of the processor module 24 includes removing a CPU card, a RAM card, a ROM card, and FOXNET interface cards which enable the processor module 24 to communicate over preexisting buses 13 to the operator workstation 15.

Next, at step 106, a single upgrade processor module 24' (see FIG. 2) is installed in the processor module system in the place previously occupied by the second processor module 24. However, the upgrade processor module 24' is connected to the new fieldbus 14 rather than the FOXNET bus 13. In view of the improvements to integrated circuit technology and changes to network technology, this set of cards is replaced in the upgrade system by a single processor module card comprising an INTEL 80186EC microprocessor, interface hardware for communicating with the control processor 2 via the redundant buses 14, a 512K RAM and a 512K ROM. In a preferred embodiment of the present invention, the upgrade processor module is an automatically configurable, multi-use SPECTRUM MIGRATION INTEGRATOR (SMI) card manufactured and sold by The Foxboro Company.

It is important that the upgrade processor module does not send control information to any of the I/O components in the attached I/O nests 29 until it has been properly initialized and its functionality verified. To this end, two hardware jumpers are included on the upgrade processor module which are adjusted to limit the write capabilities of the upgrade processor module. Before, installing the upgrade processor module card and until the upgrade processor module is initialized, both jumpers are placed in the "in" position. With both jumpers in the "in" position, the upgrade processor module reads values from the data buffer card 28 and the PIO bus 38. This mode of operation is referred to as the "upgrade" mode.

While in the upgrade mode, the upgrade processor module has no write capabilities. The upgrade processor module may only read input and output values for control blocks associated with the I/O components in the I/O nests 29. These values are in turn read by the control processor 2. Thus, during the upgrade mode of operation, the control processor 2 tracks output values provided by the upgrade processor module in order to verify the proper function of the upgrade processor module by comparing values provided by the upgrade processor module to ones provided by the first processor module 20 corresponding to a same control loop. However, the upgrade processor module cannot write to the data buffer card 28 nor can it write values to the I/O components in the attached I/O nests 29 while in the upgrade mode.

After an operator verifies the functionality of the control blocks within the upgrade processor module 24' by observing a sequence of output values from the upgrade processor module 24', at step 108 the upgrade processor module 24' enters the "upwrite" mode wherein control over I/O components on the attached I/O nests 29 is migrated to the upgrade processor module 24' inserted in the place of the original backup processor module 24 during step 106. In the preferred embodiment of the invention, the upgrade processor module 24' enters the upwrite mode after a user pulls one of two jumpers on the upgrade processor module card thereby causing the upgrade processor module 24' to access "upwrite mode" bus arbitration firmware. This enables the upgrade processor module 24' to access certain control loops designated by an operator during later described control loop transfer steps. However, in the event that the first processor module 20 fails, the upgrade processor module 24' will not take over any control loops that were not specifically transferred by an operator.

Next, at step 110 the actual transfer of control loops commences. During step 110 an operator, via the workstation 6 and attached interface devices 8, specifies a control loop associated with one of the I/O components in the attached I/O nests 29 whose controls is to be transferred from the primary processor module 20 to the upgrade processor module 24' that replaced the second processor module 24. The specified control loop is deleted from the control blocks maintained by the first processor module 20 thus inhibiting additional write operations from the first processor module 20 associated with the deleted control loop. However, an associated output card holds the last output value associated with the transferred control loop. The output value is held as long as power is supplied to the associated output card in the nest 29.

On the upgrade processor module side of the processor module system, the upgrade processor module 24' receives an instruction from the control processor 2, and in response the upgrade processor module 24' database is modified to indicate that write capabilities over the transferred loop have been transferred to the upgrade processor module, and the upgrade processor module commences providing, to a proper I/O card within the I/O nests calculated control, values for equipment involved in an industrial process.

In particular, an operator or process engineer accesses the control database in the control processor 2 and modifies the configuration data for the loop that is to be transferred from the processor module 20 to the upgrade processor module 24' in order to indicate that the upgrade processor module 24' is permitted to write information to the control blocks. Thereafter, the control processor 2 downloads the new configuration data to the upgrade processor module 24'. After receiving the new configuration data, the upgrade processor module 24' allows writes to the control block associated with the transferred loop to pass through to the output card in the nest 29 associated with the transferred loop.

Since the last value from the first processor module 20 is held until being replaced by a first calculated value from the upgrade processor module 24', and the upgrade processor module 24' begins sending new control output values corresponding to the transferred single control loop in a matter of seconds, the industrial process associated with the transferred control loop is not disrupted by the transfer. This is referred to as a bumpless transfer of control. Furthermore, the above-described control loop transfer may be reversed, thereby returning responsibility for a control loop back to the first processor module 24 by reversing the above control block delete and control loop designation instructions on the upgrade and first processor modules respectively.

Next, at step 112, if additional control loops remain to be transferred from the first processor module 20 to the upgrade processor module 24', then step 110 is re-visited and applied to a remaining control loop. However, if no control loops remain under the control of the first processor module 20, then control passes to step 114.

At step 114, the operator removes the second jumper on the upgrade processor module 24' thereby automatically causing the "standby" status to be removed from the upgrade processor module 24'. At this stage, the upgrade processor module 24' exercises control over all of the control loops associated with the processor module system discussed with respect to FIG. 2. The first processor module 20 is now merely a backup processor module as a result of the migration of primary responsibility of all the control loops to the upgrade processor module 24'. In order to complete the upgrade process, the first processor module 20 is also replaced, with a second upgrade processor module 20', and the original security cards 34 and 36 are reinstalled in the place of the upgrade security cards 34' and 36'. Therefore, at step 116 the first processor module 20 is assigned standby status, powered down, and then removed from the processor module system in the manner previously described for removing the second processor module 24 during steps 102 and 104.

Next, at step 118, the second upgrade processor module 20' is installed. However, in distinction to step 106, the second upgrade processor module 20' is inserted with both jumpers out (fully functional mode). If both jumpers are out, the standby status for the second upgrade processor module 20' will be removed during step 124 after the second upgrade processor module 20' has initialized. The second upgrade processor module 20', operating in the fully functional mode, will assume control of all of the control loops in the event that the previously installed upgrade processor module 24' fails.

Next, at step 120 the upgrade security card 34' installed in place of the security card 34 is replaced by the security card 34, thereby removing the loop-by-loop control loop transfer capability from the processor module system. After installing the security card 34, the second upgrade processor module 20' is powered up and its functionality verified during step 122. After the second upgrade processor module 20' is initialized and determined to be functional by tracking values provided in its output blocks, control passes to step 124.

During step 124, primary control of all control loops is switched to the second upgrade processor module 20'. Next, the standby status is removed from the fully functional second processor module 20' in order to allow switching of control to the second upgrade processor module 20'. Thereafter, during step 124, a command is issued from the control processor 2 transferring control of all the control loops to the second upgrade processor module 20'.

At step 126 the upgrade processor module 24' that replaced the second processor module 24, during steps 104 and 106, is placed in standby status and then powered down in order to replace the remaining attached upgrade security card with the original security card 36. Thereafter, the upgrade processor module 24' (which replaced the second processor module 24) is again brought on-line as a backup controller to the second upgrade processor module 20' (which replaced the first processor module 20).

While an illustrative example has been provided of the present invention, it will be appreciated by those skilled in the art that certain modifications can be made to the disclosed preferred embodiment of the invention without deviating from the intended broadest scope of the invention. For example, in the preferred embodiment, both the first and second processor modules were upgraded. However, in alternative embodiments, only one of the processor modules is replaced. Furthermore, while the upgrade security cards were removed in order to eliminate the loop-by-loop transfer capabilities of the processor module system after a first upgrade processor module was installed and determined to be fully functional, in other embodiments of the invention, the upgrade security cards may remain in place indefinitely. In the preferred embodiment, the mode of operation of the upgrade processor modules was controlled by hardware jumpers. However, in other embodiments the mode of operation of the processor modules may be controlled via software instructions to the processor modules and their associated security cards. Yet other modifications to the disclosed preferred embodiment will be appreciated by those skilled in the art in view of the above described preferred embodiment. The scope of the present invention is intended to cover the disclosed preferred embodiment as well as those alternatives falling within the spirit and scope of the invention as defined by the claims appended below.

What is claimed is:

1. In a distributed industrial process control system, a method for replacing a processor module providing control signal data, in accordance with multiple industrial process control loops executed by the processor module, to industrial process equipment by means of a set of I/O devices communicatively coupled to an I/O bus, and wherein a bus arbitrator interposed between the I/O bus and the processor module oversees write access by the processor module to the I/O bus, said method for replacing the processor module comprising the steps of:

installing a first upgrade processor module within the distributed industrial process control system, thereby establishing a communicative link between the first upgrade processor module and the I/O bus in order to sense transmissions from the set of I/O devices;

first operating the first upgrade processor module in a partially disabled mode after the installing step, wherein write access by the first upgrade processor module to the I/O bus is prevented;

tracking a set of control outputs provided by the first upgrade processor module while the first upgrade processor module is operating in the partially disabled mode;

second operating the first upgrade processor module in a write enabled mode after the first operating step, wherein write access by the first upgrade processor module to the I/O bus is selectively enabled in order to transmit control signals, associated with ones of the multiple industrial process control loops for which write access has been designated, from the first upgrade processor module to the set of I/O devices;

transferring primary responsibility for a designated control loop of the multiple industrial process control loops from the processor module to the first upgrade processor controller; and selectively enabling write access by the first upgrade processor module to the I/O bus with respect to the designated control loop.

2. The method of claim 1 wherein the transferring step is performed multiple times, each time transferring a designated control loop for which primary responsibility remains with the processor module, until the processor module no longer has primary responsibility for any of the multiple industrial process control loops.

3. The method of claim 1 further comprising the step of:

holding a last output value, provided by the processor module, after transfer of primary responsibility to the first upgrade processor module of the designated control loop.

4. The method of claim 1 further comprising the step of:

reading, by the first upgrade processor module, a set of values in a data buffer associated with the processor module.

5. The method of claim 1 wherein the tracking step is performed by a control processor which is capable of observing values from memory written by the processor module and the first upgrade processor module.

6. The method of claim 1 further comprising the step of:

returning primary responsibility for the designated control loop of the multiple industrial process control loops from the first upgrade processor module to the processor module.

7. The method of claim 1 further comprising the step of:

entering a full operation mode in the first upgrade processor module wherein the first upgrade processor module exercises control over the control loops associated with the processor module.

8. In a distributed industrial process control system, a method for allocating process control, performed by a primary processor module, to a first processor module for purposes of thereafter providing control signal data, in accordance with multiple industrial process control loops executed by the first processor module, to industrial process equipment by means of a set of I/O devices communicatively coupled to an I/O bus, and wherein a bus arbitrator interposed between the I/O bus and the first processor module oversees write access by the first processor module to the I/O bus, said method for allocating process control to the first processor module comprising the steps of:

installing the first processor module within the distributed industrial process control system, thereby establishing a communicative link between the first processor module and the I/O bus in order to sense transmissions from the set of I/O devices;

first operating the first processor module in a partially disabled mode after the installing step, wherein write access by the first processor module to a data bus for controlling an I/O device in accordance with a process control loop is prevented; viewing a set of values provided by the first processor module while the first processor module is operating in the partially disabled mode in order to determine the proper operation of the first processor module;

second operating the first processor module in a write enabled mode after the first operating step, wherein write access by the first processor module to the data bus for controlling an I/O device is enabled in order to transmit control signals, associated with ones of the multiple industrial process control loops for which write access is selectively designated, from the first processor module to the set of I/O devices;

granting control authorization to the first processor module for a designated control loop of the multiple industrial process control loops; and selectively enabling write access by the first processor module to output a control value to be used to control an I/O device in accordance with the designated control loop.

9. The method of claim 8 wherein the granting step is performed multiple times, each time authorizing control by the first processor module over the designated control loop for which primary responsibility remains with the primary processor module, until the first processor module has authorization for all industrial process control loops associated with the primary processor module.

10. The method of claim 8 further comprising the step of:
holding a last output value, provided by the primary processor module, after a transfer of primary responsibility to the first processor module of the designated control loop during the granting step.

11. The method of claim 8 further comprising the step of:
reading, by the first processor module, a set of values in a data buffer associated with the primary processor module.

12. The method of claim 8 wherein the viewing step is performed by a control processor which is capable of observing values from memory written by the primary processor module and the first processor module.

13. The method of claim 8 further comprising the step of:
returning primary responsibility for the designated control loop of the multiple industrial process control loops from the first processor module to the primary processor module.

14. The method of claim 8 further comprising the step of:
entering a full operation mode in the first processor module wherein the first processor module exercises control over the control loops associated with the primary processor module.

15. In a distributed industrial process control system, an apparatus for allocating process control, performed by a primary processor module, to a first processor module for purposes of thereafter providing control signal data, in accordance with multiple industrial process control loops executed by the first processor module, to industrial process equipment by means of a set of I/O devices communicatively coupled to an I/O bus, said apparatus for allocating process control comprising:

a bus arbitrator interposed between the I/O bus and the first processor module including security circuitry for limiting write access by the first processor module to the I/O bus;

a mode selection switch for placing the first processor module into a set of operation modes including:
a partially disabled mode wherein write access by the first processor module to a data bus for controlling an I/O device in accordance with a process control loop is prevented, and
a write enabled mode wherein write access by the first upgrade processor module to the data bus for controlling an I/O device is enabled in order to transmit control signals, associated with ones of the multiple industrial process control loops for which write access is selectively designated, from the first processor module to the set of I/O devices;

a supervisory control device for reviewing a set of values provided by the first processor module while the first processor module is operating in the partially disabled mode in order to determine the proper operation of the first processor module;

means for granting control authorization to the first processor module for a designated control loop of the multiple industrial process control loops while the first processor module is in the write enabled mode; and means for selectively enabling write access by the first processor module to output a control value to be used to control an I/O device in accordance with the designated control loop while the first processor module is in the write enabled mode.

16. The apparatus of claim 15 wherein the means for granting control authorization includes means for repeating granting authorization for a designated control loop, each time authorizing control by the first processor module over the designated control loop for which primary responsibility remains with the primary processor module, until the first processor module has authorization for all industrial process control loops associated with the primary processor module.

17. The apparatus of claim 15 including means for holding a last output value, provided by the primary processor module, after a transfer of primary responsibility to the first processor module of the designated control loop during the granting step.

18. The apparatus of claim 15 wherein the supervisory control device is a control processor which is capable of observing values from memory written by the primary processor module and the first processor module.

19. The apparatus of claim 15 further comprising:
means for returning primary responsibility for the designated control loop of the multiple industrial process control loops from the first processor module to the primary processor module.

20. The apparatus of claim 15 wherein the set of operation modes includes:
a full operation mode wherein the first processor module exercises control over the control loops associated with the primary processor module.

* * * * *